United States Patent [19]

Kampf et al.

[11] Patent Number: 4,634,951
[45] Date of Patent: Jan. 6, 1987

[54] REDUCED VOLTAGE STARTER WITH VOLTAGE RAMP CONTROL

[75] Inventors: Julian C. Kampf, Grafton; Jeffrey A. Reichard, Milwaukee; James T. Libert, Waukesha; Earl J. Curran, Jr., South Milwaukee; Richard J. Graefe, Bayside, all of Wis.

[73] Assignee: Square D Company, Palatine, Ill.

[21] Appl. No.: 743,862

[22] Filed: Jun. 3, 1985

Related U.S. Application Data

[63] Continuation of Ser. No. 443,002, Nov. 19, 1982.

[51] Int. Cl.⁴ .......................... H02P 1/28; H02P 1/30
[52] U.S. Cl. ..................................... 318/778; 318/729
[58] Field of Search ................ 318/729, 798, 778, 779

[56] References Cited

U.S. PATENT DOCUMENTS

| | | | |
|---|---|---|---|
| 3,670,237 | 6/1972 | Hubel et al. | 318/778 |
| 4,072,880 | 2/1978 | Oshima et al. | 318/778 |
| 4,355,274 | 10/1982 | Bourbeau | 318/729 |
| 4,384,243 | 5/1983 | Muskovac | 318/729 |
| 4,404,511 | 9/1983 | Nola | 318/729 |
| 4,468,603 | 8/1984 | Vander Meer et al. | 318/778 |

Primary Examiner—David Smith, Jr.
Attorney, Agent, or Firm—A. Sidney Johnston; James W. Potthast

[57] ABSTRACT

Gradual starting of an electric motor is provided by increasing the voltage applied to the motor. A reduced voltage starter controls the application of a voltage derived from a line voltage to a motor by using a voltage ramp acceleration control circuit comprising, means for generating a ramp voltage having a predetermined rate of rise, means for controlling the voltage applied to the motor in response to the ramp voltage, means for sensing that the motor is running at substantially full speed, and means responsive to the means for sensing that the motor is running at substantially full speed for increasing the predetermined rate of rise of the ramp voltage, whereby under conditions where the motor is running at substantially full speed before the voltage applied to the motor reaches the line voltage, then the voltage applied to the motor will rise at the increased predetermined rate of rise of the ramp voltage.

9 Claims, 3 Drawing Figures

REDUCED VOLTAGE STARTER WITH VOLTAGE RAMP CONTROL

This application is a continuation of application Ser. No. 443,002, filed Nov. 19, 1982.

BACKGROUND OF THE INVENTION

This invention relates to a circuit for controlling power to a motor and, more particularly, to such a circuit in which the voltage applied to the motor is increased from zero voltage to the maximum voltage over a preselected period of time. This invention is related to the following application assigned to the assignee of the present application and filed contemporaneously with it.

| Appl. Ser. No. | Inventor | Title |
| --- | --- | --- |
| 443,003 | Jeffrey Reichard | Reduced Voltage Starter with Power Factor Control Circuit |
| 442,986 | Earl Curran | Reduced Voltage Starter with Linear Timed Acceleration |
| 443,342 | Richard Graefe | Reduced Voltage Starter with Overload Protection |
| 443,001 | James Libert | Reduced Voltage Starter |

Many motor starting applications require that an induction motor or the like be gradually started over a preselected period of time. The very slow starts are best achieved by gradually increasing the voltage applied to the motor. At the same time, however, it is desired to place a limit on the maximum current to be drawn by the motor during starting.

SUMMARY OF THE INVENTION

The invention provides gradual starting of an electric motor by increasing the voltage applied to the motor. The invention is a reduced voltage starter for controlling the application of a voltage derived from a line voltage to a motor, a voltage ramp acceleration control circuit comprising: means for generating a ramp voltage having a predetermined rate of rise, means for controlling the voltage applied to the motor in response to the ramp voltage, means for sensing that the motor is running at substantially full speed, and means responsive to the means for sensing that the motor is running at substantially full speed for increasing the predetermined rate of rise of the ramp voltage, whereby under conditions where the motor is running at substantially full speed before the voltage applied to the motor reaches the line voltage, then the voltage applied to the motor will rise at the increased predetermined rate of rise of the ramp voltage.

DETAILED DESCRIPTION

Figure 1:
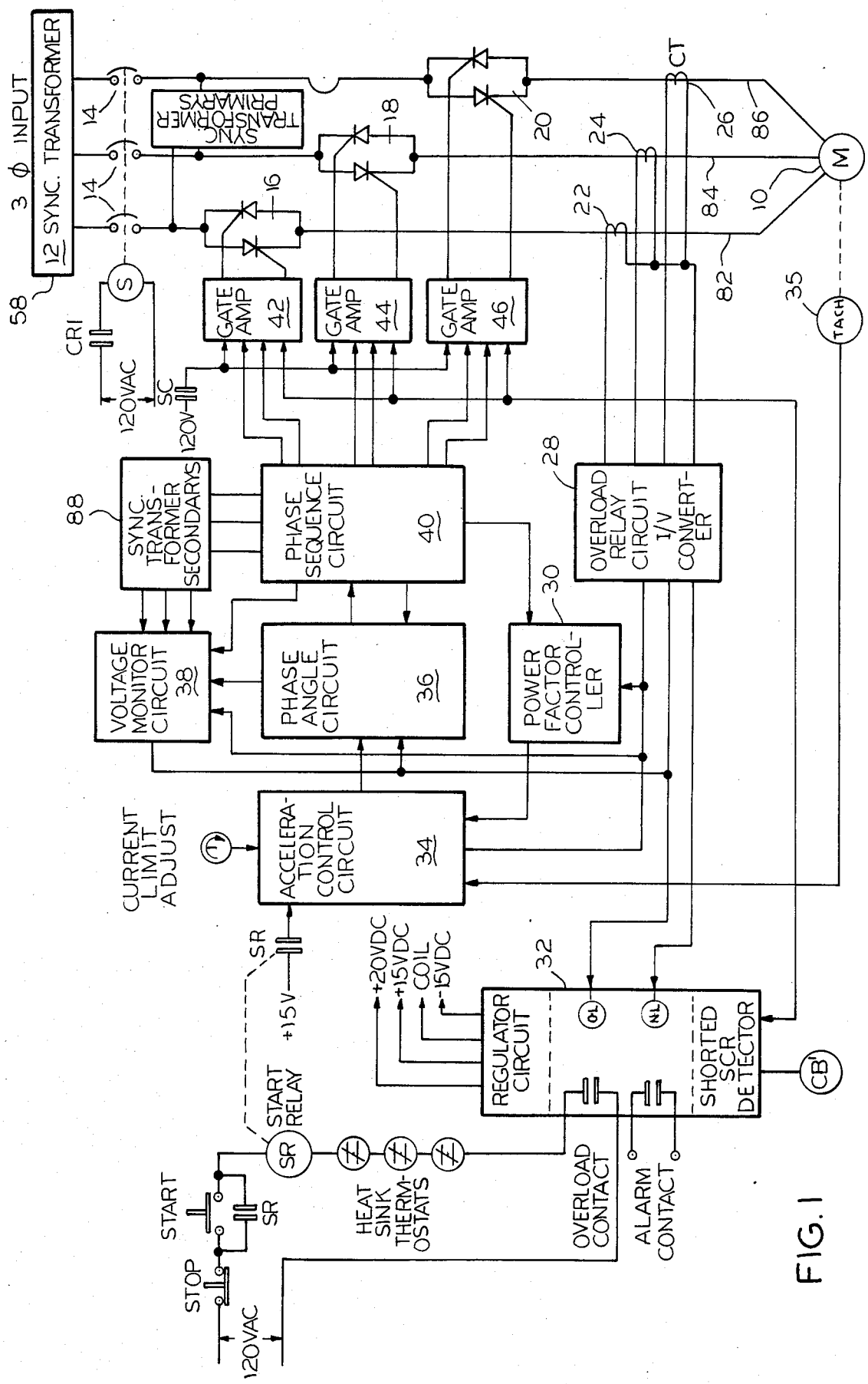
FIG. 1 is an overall block diagram of a reduced voltage starter of the present invention having a voltage ramp acceleration control circuit.

Referring to FIG. 1, the voltage ramp acceleration control circuit 34 of the present invention is shown as used in a reduced voltage starter circuit. The reduced voltage starter circuit functions to apply power to a three-phase induction motor 10 in a controlled fashion during starting of the motor. Three power inputs 50, 52 and 56 are applied to the motor from a three-phase source 58. The power to the motor is controlled by means of three semiconductor switch circuits 16, 18 and 20 respectively coupled with power leads 82, 84 and 86. The power to the motor is monitored by means of three current transformers 22, 24, and 26. These three semiconductor switching circuits, in turn, are controlled by three gate amplifier circuits 42, 44, and 46, respectively. The gate amplifier circuits, in turn are, controlled by a phase sequence control circuit 40.

The phase sequence control circuit receives inputs from three sync transformer secondaries 88, primaries of which are delta connected with the three power leads 82, 84 and 86. The phase sequence control circuit 40 receives its signals from a phase angle control circuit 36. The phase angle control circuit 36 determines the phase angle at which the semiconductor switches are turned on. The phase sequence control circuit determines the order in which the three semiconductor switches apply power to the motor. A voltage monitor control circuit 38 functions to monitor the voltage applied to the motor. The acceleration control circuit 34, on the other hand, functions to control the phase angle control circuit 36 during starting of the motor 10. After the motor has come up-to-speed, a power factor control circuit 30 functions to improve the power factor of the power applied to motor 10 by controlling the phase angle control circuit.

Figure 2:
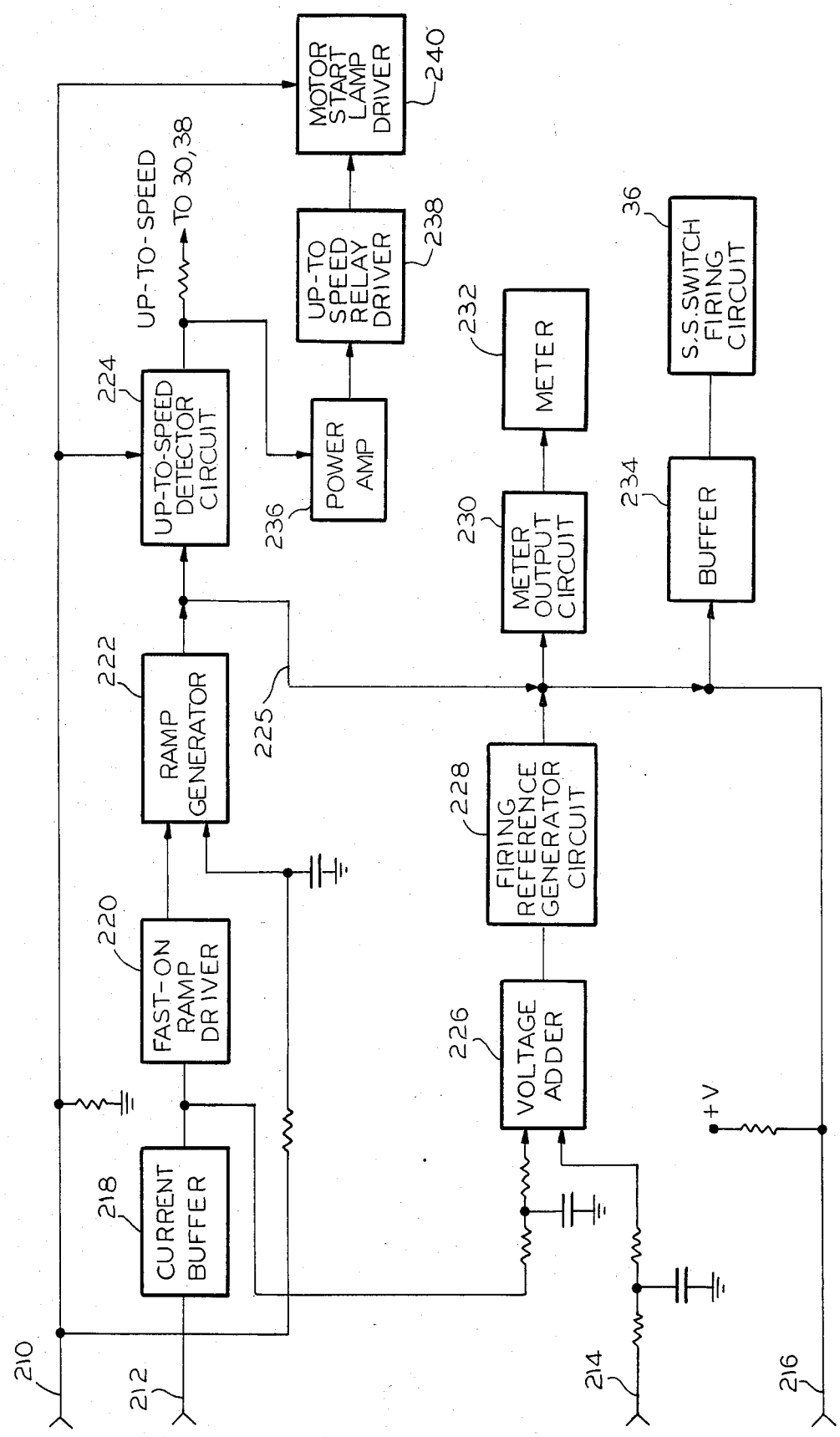
FIG. 2 is a detailed block diagram of the voltage ramp acceleration control circuit block of FIG. 1.

FIG. 2 is a block diagram of a preferred embodiment of the voltage ramp acceleration control circuit. Terminal 210 receives the voltage as a result of the closure of the start contact. Terminal 212 received a DC signal from current-voltage converter 28 which is proportional to motor current. Terminal 214 receives a DC voltage that is adjustable to set an upper limit on motor current. Terminal 216 receives a signal at an adjustable level that is controlled by the power factor controller 28 of FIG. 1.

The signal at terminal 212 is coupled to current buffer 218 and to a ramp driver 220. The output of ramp driver 220 is connected to an input of ramp generator 222 which receives another input signal from terminal 210. Operation of these components is as follows. Ramp generator 222 develops a voltage ramp which is applied through buffer 224 to phase angle control circuit 36, thence to the terminals of motor 10 of FIG 1. Ramp generator 222 has a characteristic slope that is initiated by the signal from terminal 210. This slope is adjusted in response to voltage at terminal 212 which is proportional to the present motor current. That voltage taken through current buffer 218 to fast-on ramp driver 220 alters the voltage of ramp generator 222 in response to the motor speed, as deduced from the current signal at terminal 212. If the motor appears to have reached full speed before the output of ramp generator 222 would have completed its ramp to full terminal voltage at its own rate, current buffer 218 and ramp driver 220 apply a corrective signal to ramp generator 222 to cause ramp generator 222 to achieve full voltage. The output of ramp generator 222 is coupled to up-to-speed detector 224 which is enabled by a signal from terminal 210 when the motor has been turned on. Up-to-speed detector 224 also receives a signal from bus 225 that will be described later. The output of up-to-speed detector 224 is a DC voltage that is negative during standby, and when the motor is accelerating and is a positive voltage when the motor is up to speed. This signal is coupled to power factor controller 30, to voltage monitor circuit 38 of FIG. 1 and to power amplifier 236 of FIG. 2. The output of power amplifier 236 is connected to up-to-speed relay driver 238 and is also used to light a run lamp. The output of relay driver 238 is coupled to motor start lamp driver 240 which also receives a signal from terminal 210 to provide a lamp indication that the motor is accelerating.

Terminal 214 is connected externally to the variable voltage divider to provide an adjustable reference voltage denoting an upper limit of motor current. That voltage is taken to voltage adder 226 where it is added to the output signal from current buffer 218. The output of voltage adder 226 is connected to firing reference generator circuit 228. This circuit is one of the circuits which determines the voltage on bus 225. This bus voltage is also determined by a signal at terminal 216 from power factor controller 228. The voltage on bus 225 is taken to meter output circuit 230 which drives meter 32 to indicate the status of bus 225. This voltage is also coupled to buffer 234, and then to phase angle control circuit 36 of FIG. 1 to control the firing of the SCR's.

Figure 3:
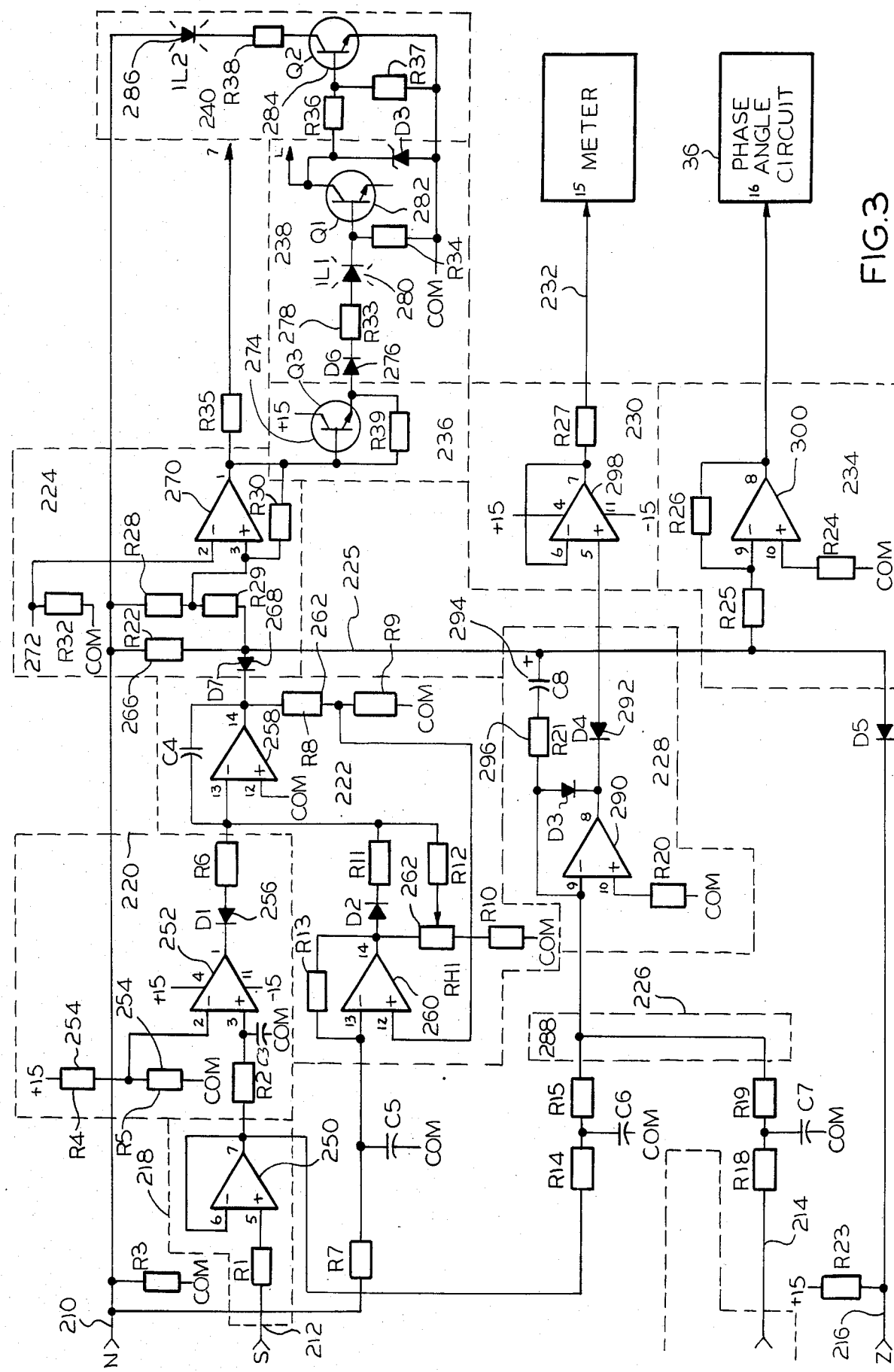
FIG. 3 is a schematic diagram of preferred circuitry for implementing the functional block diagram of FIG. 2.

FIG. 3 is a circuit diagram of preferred circuitry for implementing the functional blocks of FIG. 2. Current buffer 218 comprises a unity-gain amplifier 250. The output of amplifier 250 is coupled to one input of a comparator 252. The other input of comparator 252 is coupled to a fixed voltage divider 254. Diode 256 blocks the output of comparator 252 as long as the signal at terminal 212 and applied to amplifier 250 indicates that motor current is above some predetermined value with respect to full-load current. This value is normally taken to be 180% of full-load current. When motor current drops below the predetermined value, the output of comparator 252 reverses to generate a signal that is coupled to ramp generator 222. There it is connected to an integrator 258. This modifies the integrating rate of integrator 258. Integrator 258 is enabled by a signal from terminal 210 that is applied to one input of comparator 260. It is compared there with a signal proportional to the ramped output of integrator 258 which is obtained from voltage divider 262. Potentiometer 264 enables selection of the normal rate at which integrator 258 generates a ramp. That normal rate can be changed by an output from ramp driver 220 indicating that the motor is up to full speed.

The output of ramp generator 222 is coupled to bus 225 which is connected through a resistor 266 to a resistor 226. Resistor 226 is a pull up resistor for the voltage at terminal 210 which is a high positive voltage when the start contacts are enabled. When ramp generator 222 is generating a ramp signal, bus 225 is pulled down through means of a diode 268. Other pull down conditions for bus 225 will appear later.

Up-to-speed circuit 224 includes a comparator 270 which receives a divided voltage from bus 225. The other input to comparator 270 is a fixed voltage from a divider 272. The output of comparator 270 is coupled to power amplifier 236, which comprises a transistor 274 connected in an emitter follower configuration. The output of power amplifier 236 is taken through a diode 276 and a resistor 278 to operate a light-emitting diode (LED) 280. The LED 280 is a run lamp and provides a lighted signal when the motor is at full speed. Current through LED 238 is also taken as base current to transistor 282 which drives an up-to-speed relay. The collector voltage of transistor 282 is also taken as an input to a transistor 284 to drive LED 286. LED 286 is connected to terminal 210 to indicate that the motor is starting.

Terminal 214 receives an adjustable voltage that is set externally to indicate a desired maximum current for the motor during starting. The voltage at terminal 214 is taken to a terminal 288 which serves as an adding junction to add the output of current buffer 218. Terminal 288 is connected to an integrator 290 which holds its output voltage as long as the voltage at terminal 288 is zero. When the voltage at terminal 288 is greater than zero, this indicates that the output of amplifier 250 is at a different value from the voltage applied at terminal 214. Integrator 290 produces a signal that drives bus 225 in a direction to cause motor parameters to reduce the voltage at terminal 288. Bus 225 is then pulled down through diode 292. Integrating capacitor 294 is connected to bus 225 and through a resistor 296 to an input terminal of integrator 290.

As has been stated, the voltage level of bus 225 determines the conduction angle of SCR's 16, 18, 20 to control the voltage applied to motor 10. The voltage on bus 225 is controlled by the lowest of the outputs of ramp generator 222, firing reference generator circuit 228, and terminal 216. If the output voltage of ramp generator 222 is less than that of firing reference generator 228, ramp generator 222 controls the voltage to motor 10; if more, reference generator 228 controls. In addition, a signal from terminal 212 increases the rate of rise of voltage in ramp generator 222, causing the voltage on bus 225 to be controlled sooner by the voltage of firing reference generator 228. The voltage on bus 225 is monitored by meter output circuit 230 which includes a buffer amplifier 298 that is adapted to drive a meter 232. The voltage at bus 225 is also taken to buffer amplifier 234 which includes a unity-gain inverter 300. This couples the voltage at bus 225 to phase-angle module 36 of FIG. 1.

We claim:

1. In a reduced voltage starter for controlling the application of a voltage derived from a line voltage to a motor, a voltage ramp acceleration control circuit comprising:

means for generating a ramp voltage having a predetermined rate of rise;

means for controlling said voltage applied to said motor in response to said ramp voltage;

means for sensing that said motor is running at substantially full speed;

means responsive to said means for sensing that said motor is running at substantially full speed for increasing said predetermined rate of rise of said ramp voltage, whereby under conditions where said motor is running at substantially full speed before said voltage applied to said motor reaches said line voltage, then said voltage applied to said motor will rise at said increased predetermined rate of rise of said ramp voltage.

2. The apparatus as in claim 1 wherein said means for controlling voltage applied to said motor in response to said ramp voltage is a semi-conductor switch.

3. The apparatus as in claim 1 wherein said means for controlling said voltage applied to said motor in response to said ramp voltage comprises a thyrister.

4. The apparatus as in claim 1 further comprising means for measuring the current flow to said motor; and
 means responsive to said current flow to said motor for preventing said means for controlling said voltage from increasing said current above a predetermined value.

5. The apparatus as in claim 1 wherein said means for sensing that said motor is running at substantially full speed comprises means for sensing a drop in motor current when said motor reaches substantially full speed.

6. The apparatus as in claim 1 wherein said means for generating ramp voltage having a predetermined rate of rise comprises;
 a firing reference generator circuit for producing a signal representative of the phase angle of the turn on of a semi-conductor switch; and,
 means responsive to said firing reference generator circuit for providing an up-to-speed indication.

7. The apparatus as in claim 1 further comprising means for indicating the percentage of conduction of a semi-conductor switch.

8. A method for controlling a voltage ramp acceleration circuit in a reduced voltage starter for controlling the application of a voltage derived from a line voltage to a motor comprising;
 generating a ramp voltage having a predetermined rate of rise;
 controlling said voltage to said motor in response to said ramp voltage;
 sensing that said motor is running at substantially full speed;
 increasing said predetermined rate of rise of said ramp voltage in response to said means for sensing that said motor is running at substantially full speed, whereby under conditions where said motor is running at substantially full speed before said voltage applied to said motor reaches said line voltage, then said voltage applied to said motor will rise at said increased rate of rise.

9. The apparatus as in claim 8 further comprising;
 detecting the magnitude of a current flow to said motor; and,
 controlling said voltage applied to said motor in order to prevent said current flow from exceeding a predetermined value.

* * * * *